(12) United States Patent
Dohrendorf

(10) Patent No.: US 7,878,317 B2
(45) Date of Patent: Feb. 1, 2011

(54) ROLLER TRACK STORAGE SYSTEM AND METHOD

(75) Inventor: Ingo Dohrendorf, Pendleton, SC (US)

(73) Assignee: Engineered Products, LLC, Greenville, SC (US)

( * ) Notice: Subject to any disclaimer, the term of this patent is extended or adjusted under 35 U.S.C. 154(b) by 46 days.

(21) Appl. No.: 12/012,349

(22) Filed: Feb. 1, 2008

(65) Prior Publication Data

US 2009/0194386 A1    Aug. 6, 2009

(51) Int. Cl.
*B65G 13/12* (2006.01)
(52) U.S. Cl. .................... 193/37; 193/35 R
(58) Field of Classification Search ........... 193/35 R, 193/37; 198/780
See application file for complete search history.

(56) References Cited

U.S. PATENT DOCUMENTS

| 6,102,185 | A   | 8/2000  | Neuwirth et al. |
| 6,132,158 | A   | 10/2000 | Pfeiffer et al. |
| 6,431,808 | B1  | 8/2002  | Lowrey et al. |
| 6,490,983 | B1* | 12/2002 | Nicholson et al. ........... 108/106 |
| 6,523,664 | B2* | 2/2003  | Shaw et al. ............... 193/35 R |
| 6,641,352 | B2* | 11/2003 | Pfeiffer ...................... 414/276 |
| 6,951,441 | B2  | 10/2005 | Weaver |
| 7,591,105 | B2* | 9/2009  | Balser ........................... 52/29 |
| 2006/0277832 | A1* | 12/2006 | Balser ........................... 52/29 |

* cited by examiner

*Primary Examiner*—Gene Crawford
*Assistant Examiner*—Kavel P Singh
(74) *Attorney, Agent, or Firm*—J. Bennett Mullinax, LLC

(57) ABSTRACT

A storage system is provided. The storage system may include a roller track configured for being placed within an attic or crawl space. The roller track may have left and right side rails and a plurality of rollers that extend therebetween. At least a portion of the rollers are capable of rotating with respect to the side rails. The roller track may be configured for being oriented at an incline so that objects capable of being located on the rollers are oriented at an incline.

9 Claims, 3 Drawing Sheets

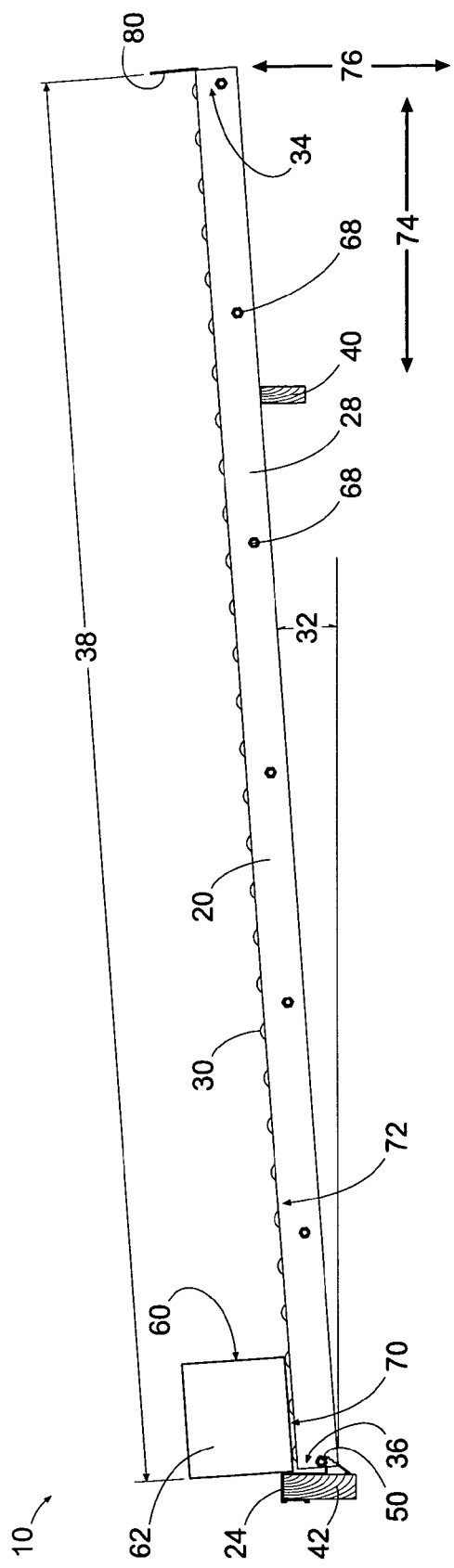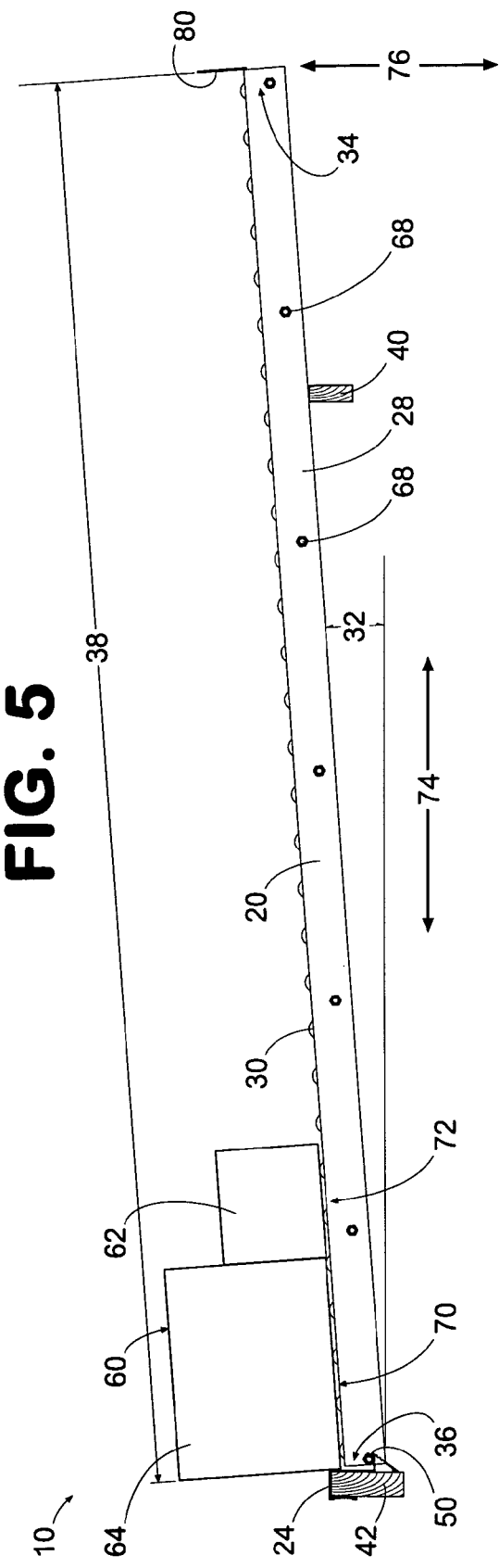

ROLLER TRACK STORAGE SYSTEM AND METHOD

FIELD OF THE INVENTION

The present invention relates generally to storage systems for use in storing objects in residential and business environments. More particularly, the present application involves a roller track based storage system that can be located in the attic or crawl space of a user's home in order to store objects in space otherwise unable to be unutilized.

BACKGROUND

Structures such as houses and buildings may include an attic into which various components of the structure are located. For example, a heating ventilating and cooling unit may be present in the attic of a structure along with various ventilation conduits, utility cables, piping and insulation. Although unsuitable as a living space, the attic of a house or business may be utilized for the storage of goods.

Problems may exist in the storage of goods in attics. For example, the floor of an attic may not be a flat surface onto which a person can rest or walk. In this regard, various ceiling joists may be present throughout the attic with insulation disposed therebetween. Arrangement of these ceiling joists and associated insulation makes movement across the attic difficult and dangerous. Further, portions of the attic may not be safe or include sufficient strength for supporting an individual. Additionally, electrical lines or cables may be run throughout the attic and may not be easily visible to the individual thus providing a tripping hazard. Still further, equipment, beams, and/or piping may be present in the attic and may block access to other portions of the attic thus eliminating its use as storage space.

Conditions in an attic are also varied. For example, rafters can be located proximate to the ceiling joists. Although plywood can be placed on top of the ceiling joists to form a floor, the storage of goods may be frustrated through the presence of rafters in this area. Further, the height of the ceiling joists may be varied thus negating the possibility of forming a floor onto the ceiling joists or mounting some other structure thereon for storage purposes.

Residences and commercial buildings may also include a crawl space located beneath the living space of the structure. Like the attic, the crawl space can include various equipment and piping thus limiting the ability of a person to traverse through the crawl space. In a similar manner to the attic, the ability to store goods in the crawl space may be hampered by the inability to move throughout the crawl space or access certain portions thereof. As such, with respect to the storage of goods within a structure there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 5 is a side view of a storage system storing a first object in accordance with one exemplary embodiment.

FIG. 6 is a side view of the storage system of FIG. 5 shown storing a first object and a second object.

Figure 1:
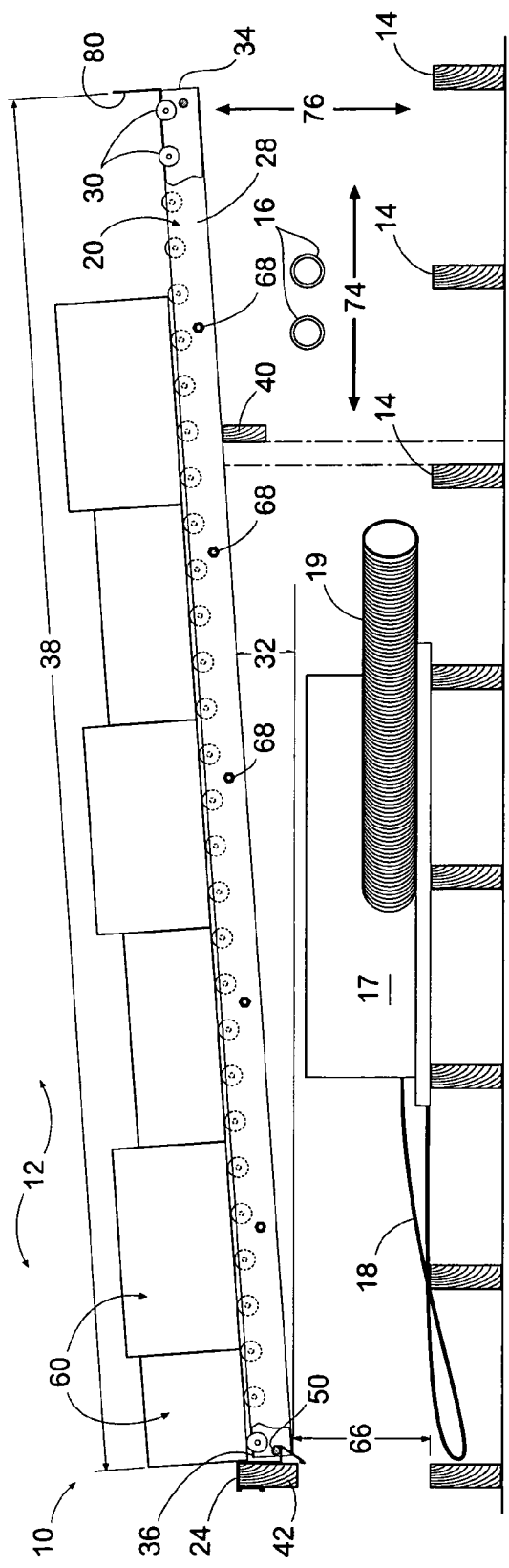
FIG. 1 is a side view of a storage system located in an attic in accordance with one exemplary embodiment.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a storage system 10 that is capable of storing objects 60 in an area of a structure such as an attic 12 or crawl space 12. The storage system 10 may include a roller track 20 onto which objects 60 that are desired to be stored are placed. The user may place new objects 60 onto the roller track 20 from a single location thus causing objects 60 all ready on the roller track 20 to move to a different spot on the roller track 20. The roller track 20 can be arranged at an incline to the ground. In this manner, objects 60 can be removed from a single location so that when a particular object 60 is removed, a subsequent object 60 will slide downwards to take its place. The storage system 10 can be mounted in the attic 12 or crawl space 12 in a number of different manners in order to access space in the attic 12 or crawl space 12 that is otherwise unusable or inaccessible.

One exemplary embodiment of the storage system 10 is shown in FIG. 1. Here, the storage system 10 is shown located in an attic 12. However, it is to be understood that the storage system 10 may be utilized in various locations of structures in accordance with other embodiments. For instance, the storage system 10 may be located in the crawl space, garage, or heated areas of a residence. Additionally, the storage system 10 need not be located in the home of a user but may instead be located in a business or other commercial structure in accordance with other exemplary embodiments.

Figure 2:
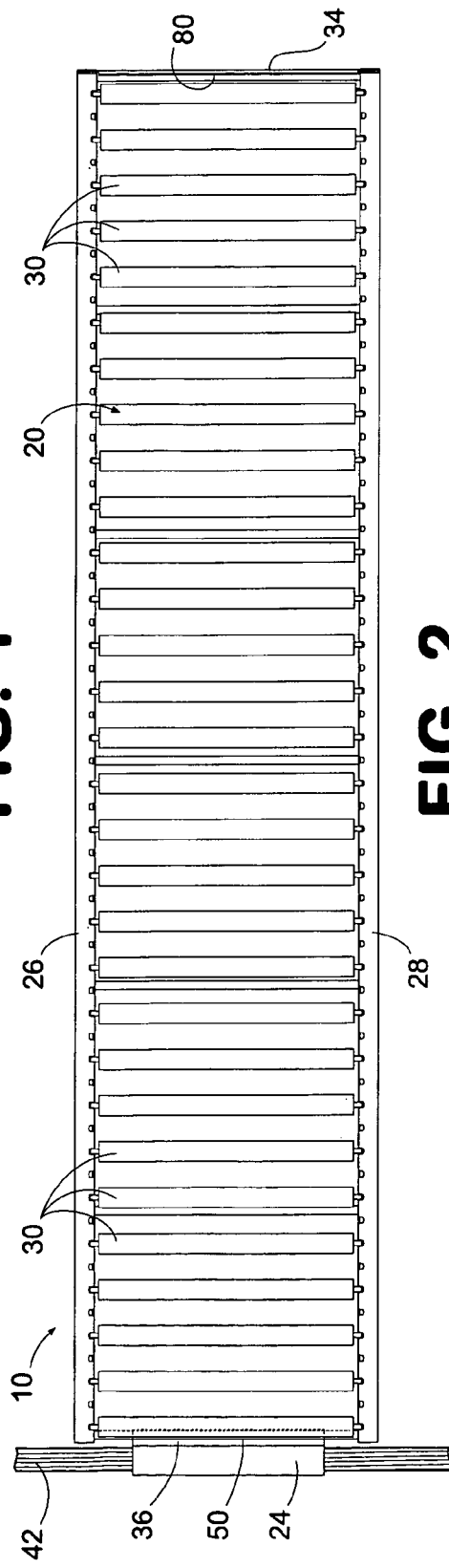
FIG. 2 is a top view of the storage system of FIG. 1.

The storage system 10 is shown as being utilized for the storage of various objects 60. The objects 60 may be goods that are placed inside of a container such as a cardboard box or a plastic vessel. However, the objects 60 need not be located in a container in accordance with other exemplary embodiments. In the exemplary embodiment illustrated in FIG. 1, the storage system 10 is completely filled with objects 60. Referring now to FIGS. 1 and 2, the storage system 10 includes a roller track 20 that in this exemplary embodiment is a ladder roller track. The roller track 20 has a left side rail 26 and a right side rail 28 that are oppositely disposed from one another on opposite sides of the roller track 20. The side rails 26 and 28 may be C-shaped channels, I-beams, tubular shaped, or irregular in shape in accordance with various exemplary embodiments. Further, the side rails 26 and 28 may be identically shaped with respect to one another or may be shaped differently in other embodiments. A plurality of rollers 30 extend between the left side rail 26 and the right side rail 28. The rollers 30 are mounted to the side rails 26 and 28 and have outer surfaces that are capable of rotating with respect to the side rails 26 and 28. The rollers 30 may be mounted on spindles extending from the side rails 26 and 28. Additionally or alternatively, a fixed bar may extend between the left side rail 26 and the right side rail 28 and the roller 30 may rotate around the axis of the fixed bar. As shown in FIG. 1, the rollers 30 are located at least partially above the top surfaces of the left side rail 26 and the right side rail 28.

The objects 60 are located on top of the rollers 30. The rollers 30 form a track length 38. In this regard, the objects 60 can be easily moved along the rollers 30 due to their rotational nature such that the objects 60 may be capable of traversing the entire track length 38. The rollers 30 can be variously configured. For example, the rollers 30 may be of various sizes and can be spaced from one another at different distances in accordance with various embodiments. Additionally, the surfaces of the rollers 30 may have various amounts of frictional resistance. Variation of these parameters may allow for an optimum quality of sliding movement of the objects 60 to be obtained.

The roller track 20 also includes a plurality of support members 68 that are located between the left side rail 26 and the right side rail 28. The support members 68 can be welded to the side rails 26 and 28 or may be attached through other means such as through the use of mechanical fasteners. The support members 68 function to help tie together the left and right side rails 26 and 28 to thus strengthen the roller track 20. the support members 68 may be disposed along the entire length of the roller track 20 or may be located along only a part of the length as desired. Any number of support members 68 can be employed and may be variously sized. Still further, other embodiments are possible in which no support members 68 are present in the roller track 20.

The roller track 20 is mounted at an incline to the ground. The angle of inclination of the roller track 20 is noted by reference number 32 in FIG. 1. Angle 32 can be variously sized in accordance with various exemplary embodiments. For example, angle 32 may be from five degrees to fifteen degrees in accordance with certain exemplary embodiments. Angle 32 may also be up to thirty five degrees in accordance with other exemplary embodiments. In accordance with one embodiment, the roller track 20 extends one half inch in the vertical direction 76 for every foot the roller track 20 extends in the horizontal direction 74.

Inclination of the roller track 20 allows for objects 60 to be retrieved from the storage system 10 when desired. For example, the storage system 10 may be located in an attic 12 such that the user can access a first end 36 of the roller track 20 but cannot access a second end 34 of the roller track 20. In this regard, the first end 36 may be located proximate to a stairway or other access point to the attic 12 while the second end 34 is located at a far end of the attic 12 that is inaccessible to the user. Should the user desire the object 60 that is located at the second end 34 of the roller track 20, the user will remove the object 60 that is located at the first end 36 of the roller track 20. This removal will cause all of the objects 60 to move downward along the roller track 20 due to its inclined orientation. As shown in FIG. 1, the objects 60 will move from the right to left. The user can continue to remove objects 60 until the desired object 60 slides to the first end 36 so as to be accessible to the user. In this manner, the user can access an object 60 that is initially at an inaccessible location of the attic 12.

Although not shown, it is to be understood that a bar or other member may be present so as to engage the object 60 located at the first end 36 so as to prevent its movement such that the additional objects 60 on the storage system 10 are likewise prevented from being moved. The object 60 at the first end 36 may alternatively rest against a portion of a first bracket 24 to thus be prevented from moving. Additionally or alternatively, another stop or combination of structures can be utilized in order to fix the position of the object 60 at the first end 36 so that the series of objects 60 are likewise held in a stationary position for storage.

Figure 3:
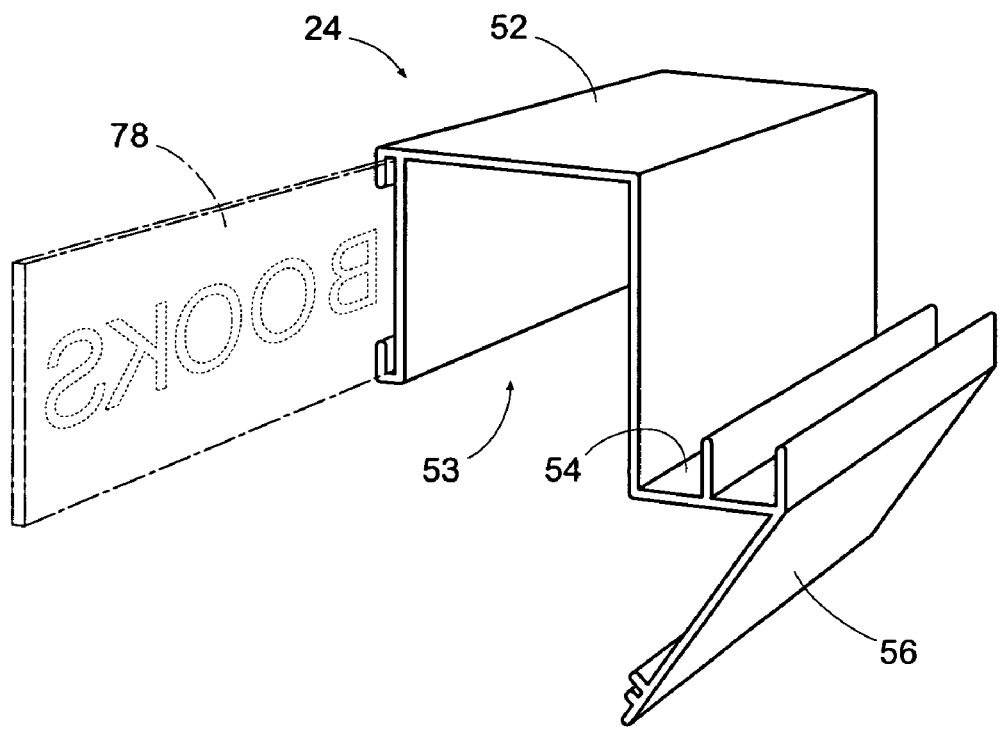
FIG. 3 is a perspective view of a first bracket in accordance with one exemplary embodiment.
Figure 4:
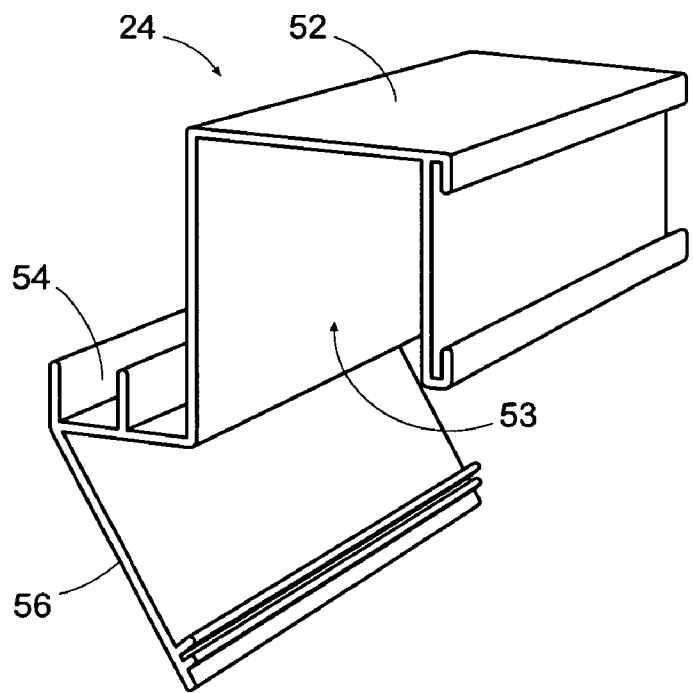
FIG. 4 is a perspective view of a first bracket in accordance with one exemplary embodiment.

The roller track 20 is shown in FIG. 1 as being mounted to a beam 42 via first bracket 24. The first bracket 24 is shown in greater detail in FIG. 3. The first bracket 24 may be made of aluminum and may be formed through extrusion in accordance with one exemplary embodiment. However, the first bracket 24 may be made from various materials and may be made in a variety of manners in other embodiments. The first bracket 24 has a beam engagement member 52 that is used in order to engage the beam 42 so that the first bracket 24 can be retained onto the beam 42. The beam engagement member 52 defines a rectangular shaped cavity 53. The rectangular shaped cavity 53 is capable of receiving a complimentary shaped portion of the beam 42 as shown in FIG. 1 so that the first bracket 24 may be securely engaged with the beam 42. However, it is to be understood that multiple arrangements may be utilized to effect engagement of the first bracket 24 and the beam 42. For example, the first bracket 24 can be fixed to the beam 42 through the use of mechanical fasteners in accordance with certain exemplary embodiments.

The first bracket 24 also includes a roller track engagement member 54 that extends from the beam engagement member 52. The roller track engagement member 54 is generally perpendicular to a wall of the beam engagement member 52 from which it extends. The roller track engagement member 54 includes a channel that is defined by two flat parallel surfaces extending from a third flat surface that is perpendicular to the two flat parallel surfaces. In other embodiments, the roller track engagement member 54 can be configured differently. For example, the roller track engagement member 54 can include one flat surface that is parallel to the wall of the beam engagement member 52 from which the roller track engagement member 54 extends. Additionally, a flat surface is also present and is perpendicular to both the one flat surface and to the wall of the beam engagement member 52.

The roller track engagement member 54 is configured to receive a first engagement member 50 of the roller track. Engagement between these two components is shown in FIGS. 1 and 2. The first engagement member 50 extends between the left side rail 26 and the right side rail 28 of the roller track 20 and is located below the rollers 30. The first engagement member 50 has a curved outer surface and does not rotate with respect to the side rails 26 and 28. The first engagement member 50 may be bolted to the side rails 26 and 28 or may be attached thereto though the use of mechanical fasteners in accordance with certain exemplary embodiments. Curvature of the first engagement member 50 allows for the angular orientation of the roller track 20 with respect to the first bracket 24, and likewise beam 42, to be desirably selected. The first engagement member 50 is thus capable of being variously positioned with respect to the roller track engagement member 54. In this regard, the angle 32 can be set a desired amount. However, it is to be understood that other arrangements are possible in which the angular orientation of the roller track 20 with respect to the first bracket 24 is not adjustable. For instance, the first bracket 24 can be mounted to the roller track 20 through the use of mechanical fasteners such that a particular angular orientation between the roller track 20 and the first bracket 24 is always evident. In accordance with still further embodiments, the first bracket 24 may be integrally formed with the roller track 20 such that these two components cannot be separated from one another.

The first bracket 24 includes a reinforcing member 56 that extends from the roller track engagement member 54. The reinforcing member 56 extends from the underside of the roller track engagement member 54 at an angle so as to extend generally back towards the beam engagement member 52. The reinforcing member 56 may contact the side of the beam 42 when the first bracket 24 is located onto the beam 42. The reinforcing member 56 acts to strengthen the first bracket 24 by providing support to the roller track engagement member 54 to help prevent this component from bending downwards due to the amount of weight applied by the roller track 20 and associated objects 60 placed thereon for storage. However, it is to be understood that other exemplary embodiments are possible in which the reinforcing member 56 is not present. A plate 78 may be included and can slide into receiving channels of the first bracket 24. The plate 78 may include indicia such as "books" or "ornaments" that may be used in order to identify items stored on the roller track 20.

The first bracket 24 may have a width that is shorter than the distance between the left side rail 26 and the right side rail 28 of the roller track 20. In this manner, the first bracket 24 may be arranged so that the only portion of the roller track 20 that contacts the first bracket 24 or the beam 42 is the first engagement member 50. However, other arrangements are possible in which various components of the roller track 20 may contact the first bracket 24 or the beam 42.

The roller track 20 rests on top of and is supported by the second beam 40 at a location along the length of the roller track 20 a particular distance from the second end 34. The first end 36 of the roller track 20 is mounted to the first beam 42 through the use of the first bracket 24 as previously discussed. It is to be understood, however, that the roller track 20 may be supported by or mounted to but a single beam in accordance with other embodiments. In still further versions of the storage system 10, the roller track 20 may be mounted and/or supported by up to ten beams.

The second beam 40 is shown being at a higher location in the vertical direction 76 than the first beam 42. This difference in position allows for the inclination of the roller track 20 to be realized. However, it is to be understood that the beams 40 and 42 can be located at the same height in the vertical direction 76 in other embodiments. For example, the second end 34 of the roller track 20 can be located on top of the second beam 40, and the first end 36 of the roller track 20 can be located on the bottom of the first beam 42. In other embodiments, the beams 40 and 42 can be at the same height and a spacing component (not shown) can be located on top of the second beam 40 in order to afford different attachment points in the vertical direction 76 so that the roller track 20 can be inclined as desired.

The beams 40 and 42 may be beams that were placed in the attic 12 at its time of construction. Alternatively, the beams 40 and 42 may be beams that are placed into the attic 12 at a time subsequent to construction with the specific intent and purpose of use in mounting the roller track 20 in the attic 12. The beams 40 and 42 may be two by fours in accordance with certain exemplary embodiments. With reference to FIG. 1, the storage system 10 is arranged so that the roller track 20 is located above the ceiling joists 14 of the attic 12. In this regard, a space 66 is present between the ceiling joists 14 and the roller track 20. The roller track 20 may be arranged so that no portion of the roller track 20 or other components such as the beam 40, beam 42, and first bracket 24 contact the ceiling joists 14. In this regard, the storage system 10 can be used regardless of whether the ceiling joists 14 extend upwards at the same height or have sheets of plywood positioned thereon. However, other arrangements are possible in which one or more components of the storage system 10 may contact the ceiling joists 14. Although shown as being mounted to the beam 42 at the first end 36, the storage system 10 can be variously arranged so that it is instead mounted onto a beam at the second end 34 and rests on top of another beam along its length or may be mounted onto a beam at the first end 36. As such, various ways of mounting the roller track 20 are possible in accordance with various exemplary embodiments and it is to be understood that the disclosed manners are only one or more examples.

The roller track 20 may be located in the attic 12 so that other items present in the attic 12 such as piping 16, HVAC components 17, cable 18 and duct work 19 are located below the roller track 20 and thus do not interfere with functioning of the storage system 10. As such, the flexibility afforded the storage system 10 allows it to be located above objects present in the attic 12, such as heating, ventilation, and air-conditioning units, to thus utilize space that would otherwise be inaccessible. Although shown as being mounted onto beams 40, 42, it is to be understood that the roller track 20 may be variously mounted in accordance with other exemplary embodiments. For instance, the roller track 20 may be mounted onto a rafter in accordance with one embodiment, or may be mounted onto a post that extends from the floor of the attic 12. As such, the roller track 20 may be mounted onto various objects present in the attic 12 in accordance with various exemplary embodiments.

FIG. 5 illustrates a step in a method of using the storage system 10 in accordance with one exemplary embodiment. Here, the storage system 10 is initially void of any objects 60 thereon. The user may desire the storage of a first object 62 and may place this first object 62 at a first location 70 of the roller track 20. As shown, the first object 62 contacts a portion of the first bracket 24 so that it is prevented from moving downwards due to inclination of the roller track 20. As previously discussed, other stops may be present to inhibit the downward movement of the first object 62.

A second object 64 may be subsequently placed onto the storage system 10 for storage. FIG. 6 shows placement of a second object 64 onto the roller track 20. The user may push the first object 62 to the right in the horizontal direction 74 so that the first object 62 moves upwards along the inclined roller track 20. The user can push the first object 62 with his or her hand, or alternatively the user may engage the first object 62 with the second object 64 to impart motion thereto. The first object 62 is pushed to a second location 72 of the roller track 20. The second object 64 is then positioned at the first location 70 which previously held the first object 62. Again, the second object 64 is prevented from moving due to engagement with the first bracket 24. However, such a stop mechanism need not be employed in other embodiments. In these cases, the roller track 20 and rollers 30 may be arranged so that the object at the first end 36 does not move.

The user may place additional objects 60 onto the roller track 20 in a similar manner. For example, the user can push all of the objects 60, such as the first object 62 and the second object 64, upwards along the inclined roller track 20 to clear a space at the first location 70. The subsequent object 60 may then be placed at the first location 70 for storage. This process may be repeated until the entire track length 38 of the roller track 20 is filled with objects 60. A backstop 80 may be present and may be mounted onto the roller track 20 to stop objects 60 from being pushed over and off of the roller track 20. The process may be reversed in order to retrieve a desired object 60 on the roller track 20. Removal of the object 60 at the first location 70 will cause the object 60 at the second location 72 to roll down the inclined roller track 20 to come to rest at the first location 70. Objects 60 may be repeatedly removed at the first location 70 until the desired object 60 is accessible to the user.

Although described as being used in the attic 12 of a residence or business, it is to be understood that the storage system 10 can be employed in other locations in accordance with other exemplary embodiments. For instance, the storage system 10 can be located in a crawl space 12 of a residence or business. The storage system 10 may alternatively be located in a garage or in the heated, interior portions of a residence or business. As such, the storage system 10 may be alternatively located in accordance with various exemplary embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A storage system in an attic of a residence, comprising:
   ceiling joists located in the attic, wherein the attic is located above living space of the residence and unsuitable as a living space of the residence;
   a beam located in the attic;
   a first bracket engaging the beam and located in the attic; and
   a roller track located in the attic that extends at an angle to the ceiling joists and that has a first end that engages the first bracket so as to effect mounting of the roller track to the beam, wherein the roller track has a left side rail and a right side rail, wherein the roller track has a plurality of rollers that extend between the left side rail and the right side rail, wherein the roller track is capable of receiving objects thereon for storage;
   wherein the first bracket has a beam engagement member that defines a rectangular shaped cavity capable of receiving a complimentary rectangular shaped portion of the beam, wherein the first bracket has a roller track engagement member capable of engaging a first engagement member of the roller track to effect engagement of the roller track to the first bracket, wherein the first engagement member is located at the first end of the roller track and has a curved outer surface.

2. The storage system as set forth in claim 1, wherein the roller track is mounted to the beam so as to be oriented at an incline with respect to the ground, wherein objects capable of being received on the roller track are urged towards the first end of the roller track due to the inclination of the roller track.

3. The storage system as set forth in claim 1, wherein the roller track is located above the ceiling joists in the attic such that a space is present between the ceiling joists and the roller track such that the beam and the first bracket do not contact the ceiling joists.

4. The storage system as set forth in claim 3, wherein the roller track is positioned in the attic such that the roller track does not contact the ceiling joists.

5. The storage system as set forth in claim 1, wherein the beam is not a component of the attic as originally constructed, wherein the beam is added to the attic for the purpose of mounting the roller track thereon.

6. The storage system as set forth in claim 1, further comprising a second beam located in the attic, wherein a portion of the roller track rests on top of the second beam.

7. The storage system as set forth in claim 1, further comprising a back stop mounted onto the roller track.

8. The storage system as set forth in claim 1, wherein the first bracket has a reinforcing member that extends from the roller track engagement member and contacts the beam when the beam engagement member engages the beam, wherein the reinforcing member functions to provide support to the roller track engagement member.

9. The storage system as set forth in claim 1, wherein the roller track is a ladder roller track, wherein the roller track has a plurality of support members that extend between the left side rail and the right side rail and function to strengthen the engagement between the left side rail and the right side rail, wherein the rollers are configured for rotating with respect to the left side rail, the right side rail, and the support members.

* * * * *